(12) United States Patent
Doorbar

(10) Patent No.: US 10,612,398 B2
(45) Date of Patent: Apr. 7, 2020

(54) CAVITY SEALING

(71) Applicant: ROLLS-ROYCE plc, London (GB)

(72) Inventor: Phillip J. Doorbar, Derby (GB)

(73) Assignee: ROLLS-ROYCE PLC, London (GB)

( * ) Notice: Subject to any disclaimer, the term of this patent is extended or adjusted under 35 U.S.C. 154(b) by 233 days.

(21) Appl. No.: 15/635,869

(22) Filed: Jun. 28, 2017

(65) Prior Publication Data

US 2018/0003063 A1  Jan. 4, 2018

(30) Foreign Application Priority Data

Jun. 29, 2016  (GB) .................................. 1611273.2

(51) Int. Cl.

| F01D 5/14 | (2006.01) |
|---|---|
| F01D 5/16 | (2006.01) |
| F01D 5/26 | (2006.01) |
| F04D 29/08 | (2006.01) |
| F04D 29/32 | (2006.01) |
| B23P 6/00 | (2006.01) |
| F01D 5/00 | (2006.01) |
| B22F 3/10 | (2006.01) |

(Continued)

(52) U.S. Cl.
CPC .................. *F01D 5/26* (2013.01); *B22F 3/10* (2013.01); *B22F 7/08* (2013.01); *B23K 20/10* (2013.01); *B23P 6/002* (2013.01); *F01D 5/005* (2013.01); *F01D 5/16* (2013.01); *F01D 5/28* (2013.01); *F04D 29/083* (2013.01); *F04D 29/324* (2013.01); *F04D 29/388* (2013.01); *F04D 29/668* (2013.01); *B22F 5/04* (2013.01);

*F05D 2220/32* (2013.01); *F05D 2230/233* (2013.01); *F05D 2230/234* (2013.01); *F05D 2230/31* (2013.01)

(58) Field of Classification Search
CPC ... F01D 5/005; F01D 5/26; F01D 5/16; F01D 5/147; F01D 5/18; B23K 20/10; F05D 2300/615

See application file for complete search history.

(56) References Cited

U.S. PATENT DOCUMENTS 4,281,235 A * 7/1981 Peloquin .................. B23K 1/19
                                                               219/121.14
5,498,137 A * 3/1996 El-Aini ..................... F01D 5/16
                                                               416/144

(Continued)

FOREIGN PATENT DOCUMENTS

| DE | 102013214932 | 2/2015 |
|---|---|---|
| EP | 926312 | 6/1999 |

(Continued)

OTHER PUBLICATIONS

Great Britain Search Report dated Oct. 14, 2016 issued in GB Patent Application No. 1611273.2.

*Primary Examiner* — Dwayne J White
*Assistant Examiner* — Wesley Le Fisher
(74) *Attorney, Agent, or Firm* — Oliff PLC

(57) ABSTRACT

A method of sealing one or more openings provided in a wall of an aerofoil for a gas turbine engine, the aerofoil comprising at least one cavity which is at least partly filled with a vibration damping material, the method comprising steps to provide a metallic material onto the wall of the aerofoil in order to cover the opening and bond the metallic material to the wall of the aerofoil to seal the opening.

14 Claims, 3 Drawing Sheets

(51) Int. Cl.
*B22F 7/08* (2006.01)
*B23K 20/10* (2006.01)
*F01D 5/28* (2006.01)
*F04D 29/38* (2006.01)
*F04D 29/66* (2006.01)
*B22F 5/04* (2006.01)

(56) References Cited

U.S. PATENT DOCUMENTS

| | | | | |
|---|---|---|---|---|
| 8,225,506 | B2* | 7/2012 | Chivers | F01D 5/147 264/261 |
| 9,359,901 | B2* | 6/2016 | Evans | F01D 25/005 |
| 2005/0254955 | A1* | 11/2005 | Helder | B23K 20/122 416/233 |
| 2006/0134454 | A1* | 6/2006 | Sathian | B22F 1/0003 428/668 |
| 2008/0025845 | A1* | 1/2008 | Clark | F01D 5/16 416/223 A |
| 2010/0143097 | A1* | 6/2010 | Read | F01D 5/147 415/119 |
| 2012/0037602 | A1* | 2/2012 | Doorbar | C22C 47/04 219/121.14 |
| 2012/0228272 | A1* | 9/2012 | Carlson | H02K 15/0012 219/75 |
| 2013/0039774 | A1 | 2/2013 | Viens et al. | |
| 2013/0081269 | A1* | 4/2013 | Trapp | B23P 6/00 29/888 |
| 2014/0161618 | A1* | 6/2014 | Walker | B23K 15/0006 416/223 A |
| 2014/0170435 | A1* | 6/2014 | Hui | F01D 5/147 428/613 |
| 2014/0255718 | A1 | 9/2014 | Slattery | |
| 2015/0033559 | A1* | 2/2015 | Bruck | B23K 26/0661 29/889.1 |
| 2015/0037498 | A1* | 2/2015 | Bruck | B05D 3/0254 427/229 |
| 2015/0125308 | A1* | 5/2015 | Radomski | B23P 15/04 416/224 |
| 2015/0174707 | A1* | 6/2015 | Li | B23P 6/045 427/142 |
| 2015/0233264 | A1* | 8/2015 | Hyatt | F01D 25/04 415/119 |
| 2016/0222821 | A1* | 8/2016 | Klinetob | F01D 9/041 |
| 2016/0305443 | A1* | 10/2016 | Schwarz | B23K 20/122 |

FOREIGN PATENT DOCUMENTS

| | | |
|---|---|---|
| EP | 2362066 | 8/2011 |
| EP | 2851512 | 3/2015 |
| EP | 2907973 | 8/2015 |
| EP | 3051076 | 8/2016 |

* cited by examiner

CAVITY SEALING

CROSS-REFERENCE TO RELATED APPLICATIONS

This application is based upon and claims the benefit of priority from British Patent Application Number 1611273.2 filed 29 Jun. 2016, the entire contents of which are incorporated by reference.

BACKGROUND

1. Field of the Disclosure

The present disclosure relates to a method and apparatus for the sealing of a cavity in an aerospace component. In particular, it relates to a method and apparatus for the provision of a metallic material onto an aerofoil so as to seal a cavity.

2. Description of the Related Art

It is known to use hollow aerofoils, or aerofoils comprising one or more cavities, in order to provide a weight saving advantage. Some cavities can be formed by inflating an aerofoil pre-cursor at superplastic temperatures. It is common for at least one of said cavities to comprise an internal metallic structure to increase strength and prevent so called panting of the walls of the aerofoil, i.e. movement towards and away from each other.

To facilitate damping and reduce vibration of the component, the hollow cavities may be filled with a damping material, such as a visco-elastic material. Cavity walls may comprise one or more protrusions which provide additional surface area to increase adhesion between the damping material and the cavity wall, so preventing the damping material from becoming displaced relative to the cavity wall following manufacture. It is common for two or more openings to be made through one or more of the cavity walls in order to allow the damping material to be flowed into the cavities.

Once the component has been filled with the damping material, the openings within the wall of the component may be plugged using a filler, glue, resin or composite material, or a polymeric/elastomeric preform inserted into the opening. However, the use of such filler, glue, resin, composite, polymeric or elastomeric materials is problematic due to the time taken for the material to cure, the potential for damage of the damping material within the component, and the lack of chemical and heat resistance during subsequent processing steps, service and/or repair. Additionally, quality control of the opening filler forming the plug is difficult. This leads to the potential for the plug to come out of the opening following insertion due to for example, differing thermal expansion coefficients and therefore thermal expansions between the opening filler and the component.

It would therefore be advantageous to provide a method and apparatus for the sealing of a cavity in an aerospace component without the aforementioned disadvantages.

OBJECTS AND SUMMARY

The present disclosure accordingly provides, in a first aspect, a method of sealing one or more openings provided in a wall of an aerofoil for a gas turbine engine, the aerofoil comprising at least one cavity which is at least partly filled with a vibration damping material, the method comprising steps to:

a) provide a metallic material onto the wall of the aerofoil in order to cover the opening; and, b) bond the metallic material to the wall of the aerofoil to seal the opening In this way, the method provides the ability to provide a method for the sealing of a cavity in an aerospace component which provides substantial chemical and heat resistance during subsequent processing steps, service and/or repair without chemically or microstructurally altering a vibration damping material comprised within the aerofoil. Additionally, the method provides a method of sealing of a cavity in an aerospace component which provides added structural integrity and/or rigidity to the component. Furthermore, the method provides a method to prevent a plug from becoming dislodged from one or more openings provided in a wall of an aerofoil during use.

Optionally, step a) may comprise steps to overlap the metallic material and the wall such that a weld interface between the metallic material and the wall is generally co-planar with the wall of the aerofoil.

In this way, the method provides a strong bonding interface between the metallic material and the wall of the aerofoil with a large surface area.

Optionally, the metallic material may comprise a metal or alloy comprising either or both of substantially identical chemical composition or mechanical properties to the wall of the aerofoil.

In this way, the microstructural, chemical or thermal properties of the metallic material and aerofoil are at least partially similar. In this way, contamination, differential expansion and compatibility issues, such as, for example, galvanic corrosion resulting from metallographic missmatch are at least partially overcome.

Optionally, the method may comprise steps to form a planar section on the wall of the aerofoil in an area adjacent to or surrounding the opening.

In this way, the metallic material may be deposited on an at least partially flat or planar surface, the deposition process being made increasingly convenient and of reduced complicity due to the ability to deposit material on an at least partially flat or planar surface rather than a wall of complex geometry or curvature.

Optionally, the steps to form a planar section on the wall of the aerofoil may comprise further steps to remove at least a portion of the wall from the aerofoil.

In this way, the planar surface may be formed by machining away or removing at least a portion of the external aerofoil wall. This may provide the added advantage of removing any contaminated or non-conforming material arranged on the outer face of the aerofoil in an area adjacent the opening, the machining or removal process exposing substrate material conforming to quality standards.

Optionally, the steps to form a planar section on the wall of the aerofoil may comprise further steps to provide a metallic material onto the wall of the aerofoil.

In this way, the planar surface may be formed by adding material to at least a portion of the external aerofoil wall. This may provide the added advantage of providing fresh standard-conforming material of known microstructural, compositional and physical properties arranged on the outer face of the aerofoil in an area adjacent the opening, which the metallic material may be deposited on and/or bonded to.

Optionally, the metallic material may comprise two or more layers.

In this way, the metallic layer may be built up to a desired thickness over two or more deposition steps rather than being deposited in a single step. Optionally, the size and/or thickness of deposited layers may vary according to curvature and contour of the aerofoil, or location of the openings upon the wall of the aerofoil.

Optionally, step b) may comprise steps to heat and plasticise at least a portion of the aerofoil wall and one or more layers of the metallic material.

In this way, bonding of the one or more layers of the metallic material and the aerofoil may be achieved by: heating at least a portion of both the metallic material and the aerofoil into their respective plasticised temperature bands; applying a positive pressure to the metallic material and the aerofoil whilst both the metallic material and the aerofoil into their respective plasticised temperature bands; and, cooling at least a portion of both the metallic material and the aerofoil to below their respective plasticised temperature bands in order to provide the bond.

Optionally, at least a portion of the aerofoil wall may be heated prior to or during step a).

In this way, the heating process may require less frictional interaction between the metallic material and the aerofoil in order for both the metallic material and the aerofoil to be heated into their respective plasticised temperature bands. Optionally, additional heating of one or more of the metallic material and the aerofoil may be provided to the respective component either before or during the heating and plasticising step to aid in the bonding process.

Optionally, the metallic material may be provided in the form of one or more of a plate, strip, ribbon or a body of further three-dimensional shape.

In this way, the amount of material used in each of the one or more layers can be tightly controlled to ensure that minimal amounts of material are used, and therefore wasted, during the bonding process.

Optionally, the metallic material may be a metallic plug or blocking member, step a) comprising steps to insert the plug or blocking member into the opening prior to step b).

In this way, the plug may be located within the opening before bonding the plug to the wall. In this way, the metallic material is provided in the form of the plug, and the plug is bonded to the walls of the opening extending through the wall of the aerofoil. Furthermore, the plug may be about the same length as the opening extending through the wall of the aerofoil. Alternatively, the plug may be of smaller length than the opening extending through the wall of the aerofoil. Further alternatively, the plug may be of greater length than the opening extending through the wall of the aerofoil. In the final example where the plug may be of greater length than the opening, the plug may protrude from one or more of out of the inner wall of the aerofoil, that is into the cavity, or from the outer wall of the aerofoil.

Optionally, step b) may comprise steps to ultrasonically weld the metallic material to the wall of the aerofoil.

In this way, the metallic material may be bonded to the wall of the aerofoil using ultrasonic bonding methods, thus utilising friction to at least partially plasticise one or more of the wall of the aerofoil and the metallic material.

Optionally, the metallic material may be bonded in one or more of a solid, plastic or liquid state.

In this way, metallic material itself may be bonded over a broad range of temperatures depending on thermal requirements of the aerofoil. In this way, the metallic material can be of differing microstructural, chemical, compositional or material construction to that of the aerofoil, the process allowing bonding temperatures to vary accordingly.

Optionally, the metallic material may be provided in the form of a powder.

In this way, the metallic material can be deposited in the form of a powder or a cluster of separate particles of small or large diameter on one or more of within the opening, upon the planar section, or upon the aerofoil before being selectively sintered, welded, or brazed to form a solid material layer.

Optionally, step b) may comprise steps to laser, electron or particle beam weld the metallic material to the wall of the aerofoil.

In this way, the deposited layer of material may be selectively sintered, welded, or brazed to form a solid material layer. The use of laser, electron or particle beam welding allows highly localised heating of the deposited material, so allowing a smaller heat affected zone and requiring a reduced amount of heat energy to provide the bond. A smaller heat affected zone requires a reduced amount of heat, which limits the amount of heat which may be transferred into the damping material.

Optionally, the method may comprise steps to at least partially solidify the damping material before step a).

In this way, the at least partially solidified damping material may itself form a plug within one or more of the openings through the wall of the aerofoil. In this way, a separate plug need not be added to one or more of the openings through the wall of the aerofoil prior to the addition of the metallic material to the wall of the aerofoil, and covering of the opening.

Optionally, the method may comprise steps to remove excess metallic material from the wall of the aerofoil following step b).

In this way, any excess material protruding from the outer wall of the aerofoil may be removed so as to return the component to pre-defined geometrical tolerance and/or acceptance limits.

Optionally, the step to remove excess metallic material may comprise steps to assess the dimensions of the aerofoil against a target shape, dimension, range or value before or during the steps to remove excess metallic material, in order to ascertain a quantity of excess metallic material to be removed.

In this way, the exact quantity of material to be removed may be determined prior to removing the material. In this way, the process may be automatically carried out using automated CAD/CAM methods.

Optionally, the excess metallic material may be removed using manual or computer aided linishing, polishing, machining, adaptive machining, electro machining, electrochemical machining or chemical machining methods.

In this way, the process may be carried out using the most efficient CAD/CAM methods, so reducing the time taken to carry out the process and improving the accuracy of the step to remove excess metallic material.

Optionally, the method may comprise steps to assess the dimensions of the aerofoil after steps to remove excess metallic material, in order to determine whether the aerofoil is within a dimensional specification or tolerance margin.

In this way, the CAD/CAM assisted methods to remove excess metallic material may be carried out as part of a feedback process, so assessing the quantities of material to be removed during the material removal process. In this way, the process may assess the dimensions of the aerofoil after each material removal step.

The present disclosure accordingly provides, in a second aspect, an aerofoil for a gas turbine engine, the aerofoil comprising one or more openings provided in a wall of the aerofoil; and at least one cavity which is at least partly filled with a vibration-damping material; at least one of the openings provided in the wall of the aerofoil being covered with a metallic material, the metallic material having been bonded to the wall of the aerofoil to seal one or more of the openings.

In this way, the apparatus provides the ability to provide for the sealing of a cavity in an aerospace component which provides substantial chemical and heat resistance during subsequent processing steps, service and/or repair without chemically or microstructurally altering a vibration damping material comprised within the aerofoil. Additionally, the apparatus provides for sealing of a cavity in an aerospace component which provides added structural integrity and/or rigidity to the component. Furthermore, the apparatus provides a aerospace component which prevents a plug from becoming dislodged from one or more openings provided in a wall of the aerospace component during use.

Furthermore, a component made using the method steps previously described may be able to maintain appropriate damping of vibrations occurring during use. As such, the component may be less prone to damage or microstructurel features occurring as a function of vibration and/or effects arising through reduced damping ability. Such effects may include, for example, fatigue effects of either the component itself, or a larger component to which the component is joined or incorporated within.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF EMBODIMENTS

Figure 1:
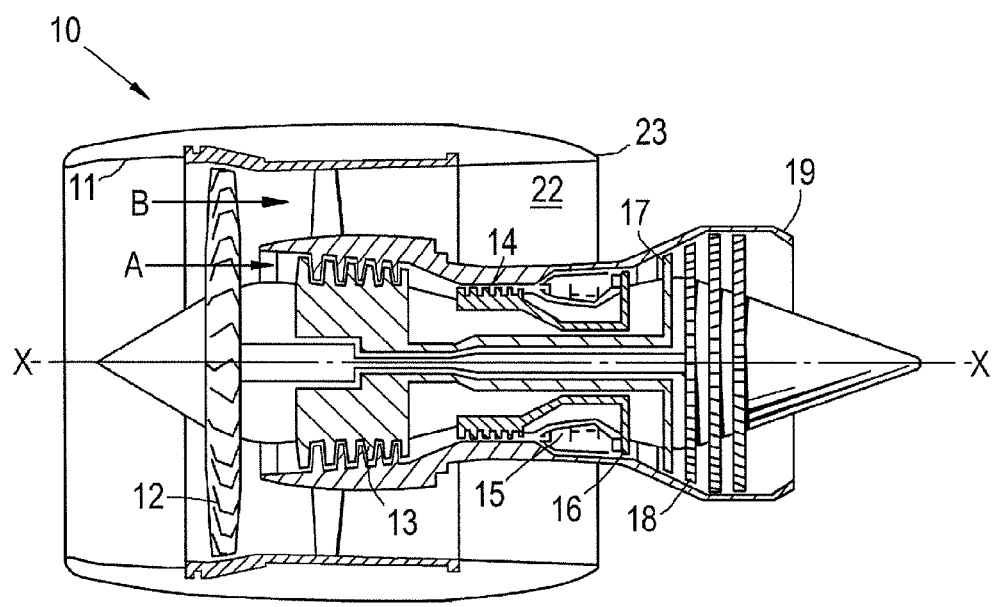
FIG. 1 shows a schematic longitudinal cross-section through a ducted fan gas turbine engine.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Figure 2:
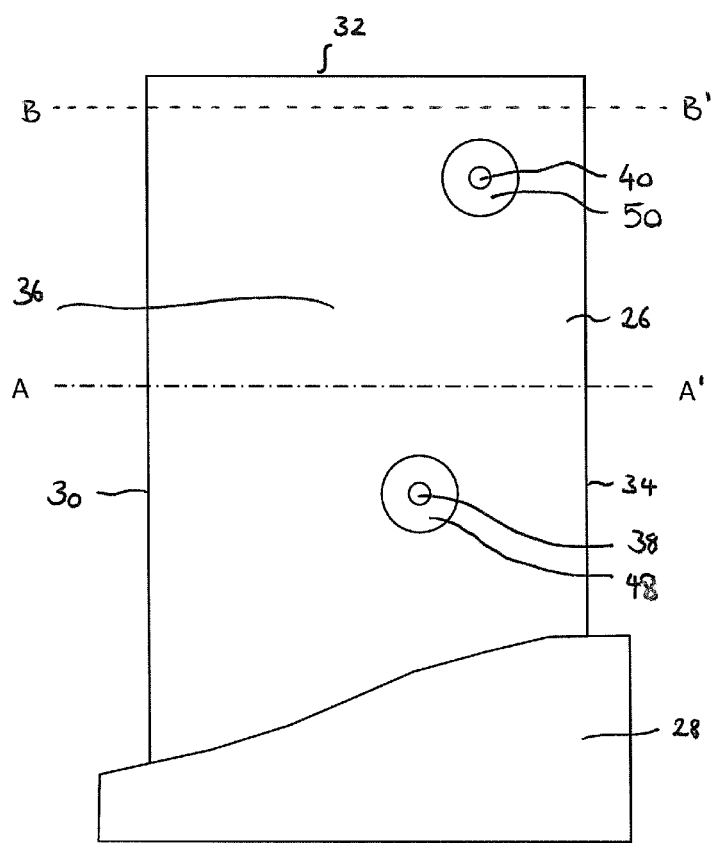
FIG. 2 shows a schematic of a hollow aerofoil and disk assembly inclusive of openings for the filling of the aerofoil with a damping material.

With reference to FIG. 2, a schematic of an aerofoil 26 and disk assembly is shown, inclusive of a portion of a disk 28. In use, it will be appreciated that the aerofoil 26 is fixed to the disk 28 using a suitable location or root feature, or alternatively, using welding or joining methods. FIG. 2 also shows a leading edge 30, a trailing edge 34, a tip 32, and an area within the outermost regions of the aerofoil generally referred to as the low pressure 36 and high pressure 37 faces, also shown in FIG. 3.

In particular, FIG. 2 shows an aerofoil 26 comprising one or more voids 42 contained between interior side-walls 44, 46 of the aerofoil 26, the aerofoil 26 further comprising a fill opening 38 and an evacuation opening 40. One or more of the fill opening 38 and the evacuation opening 40 allows for the attachment of a fitting through which a damping material is one or more of supplied and removed in order to fill one or more of the voids 42. Fill openings 38 are provided through the interior side-walls 44, 46 of the aerofoil 26, so allowing a damping material to be introduced into one or more of the voids 42. One or more evacuation openings 40 are similarly provided through the interior side-walls 44, 46 of the aerofoil 26, so allowing evacuation of gasses or fluids contained within the void 42 during the filling process. In such a case, it is most regular for one or more fill openings 38 to be located at least partially below one or more evacuation openings 40 when filling one or more of the voids 42, so allowing the evacuation of gasses or fluids of lower density than the damping material contained within the void 42 before and/or during the filling process.

In some examples, the damping material may be provided within any such void comprised within a suitable structure requiring damping. However, the aerofoil 26 depicted in FIG. 2 can include, for example, any one of the fan 12 or intermediate pressure compressor 13, or any further aerofoil arranged there between. In further examples, the hollow aerofoil 26 and disk assembly can be any of the high, intermediate and low-pressure turbines 16, 17, 18. The aerofoil 26 is comprised of one or more aerospace materials comprising either one or more composite materials, or one or more or alloys including titanium, a titanium alloy, aluminium, an aluminium alloy, nickel, a nickel alloy, a steel alloy, a magnesium alloy, a beryllium alloy, and any combination thereof known within the art for use in such components. An example of an appropriate titanium alloy can include, for example, Ti-6Al-4V. Further or alternate aerospace materials and/or alloys can be used in the construction of the aerofoil 26 depending on working temperature and mechanical property considerations including, for example, stress and creep resistance requirements over a determined temperature range.

Also shown is a planar section 48,50 adjacent each of the openings 38,40, the planar sections 48,50 having been machined for example, by using a grinding or linishing operation. It will be appreciated that any such method of mechanical, chemical, electrical or electro-chemical methods of machining and/or polishing can be used to provide such a planar section 48,50, the purpose of the planar section 48,50 being to increase the planar contact area surrounding the openings 38,40, so increasing the potential contact area for newly added material 52 around and over each of the openings 38,40. Any such shape or amount of material can be removed from the area adjacent each of the openings 38,40 in order to provide a larger surface area for the weld, thus ensuring improved mechanical properties and the potential for ultrasonic inspection of the bond joint or weld 54. Furthermore, any metallurgical or process derived issues with the bond joint, weld 54 or any newly added material 52 can be machined off and re-applied. In further examples, suitable planar sections 48,50 can be alternatively built upon the surface of the aerofoil 26. Such planar sections 48,50 can be built by, for example, one or more of additive layer manufacturing or material addition methods, including direct or blown powder laser deposition. In such a case, material addition methods can only be used pre-filling, or in post-fill situations where the heat input into the aerofoil and damping material is maintained at levels which will not deleteriously effect the damping material.

In further examples, openings 38,40 can be located in areas of reduced operational stress in order to minimise structural effects arising from the incorporation of the openings 38,40 within the aerofoil 26 structure. As such, openings 38,40 can be placed, for example, upon the low pressure face 36 of the aerofoil 26 in order to minimise the chance of fatigue induced cracking, or disruption of the metallurgical properties of the aerofoil 26. It will be appreciated that the openings 38,40 can be placed elsewhere upon the surface of the aerofoil 26, or indeed on the high pressure face 37, and the placement should not be limited to those locations depicted in FIG. 2. Furthermore, the or each opening 38,40 can be located on the same or differing faces according to in-service or manufacturing requirements.

Figure 3:
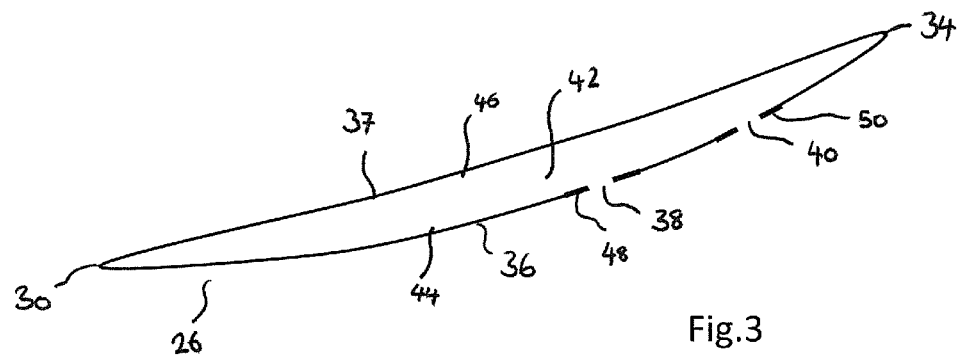
FIG. 3 shows a cross-section of a hollow aerofoil inclusive of openings for the filling of the aerofoil with a damping material.

With reference to FIG. 3, a simplified cross-section of the aerofoil 26 previously shown in FIG. 2 is shown, the cross-section showing a view of the aerofoil 26 when viewing the plane along line B-B', from line B-B' towards the disk 28. Both the low pressure 36 and high pressure 37 faces are shown, along with the interior side-walls 44, 46 of the aerofoil 26 on both the low pressure and high pressure faces 36,37, the profile and thickness of which define the innermost void 42 contained within the aerofoil 26. Also shown in FIG. 3 are the two openings 38,40 previously shown in FIG. 2, i.e. a fill opening 38 and an evacuation opening 40, one or more of which allow for the attachment of a fitting which provides a supply of damping material 56 to fill the void 42 contained between the interior side-walls 44, 46 of the aerofoil 26.

Figure 4:
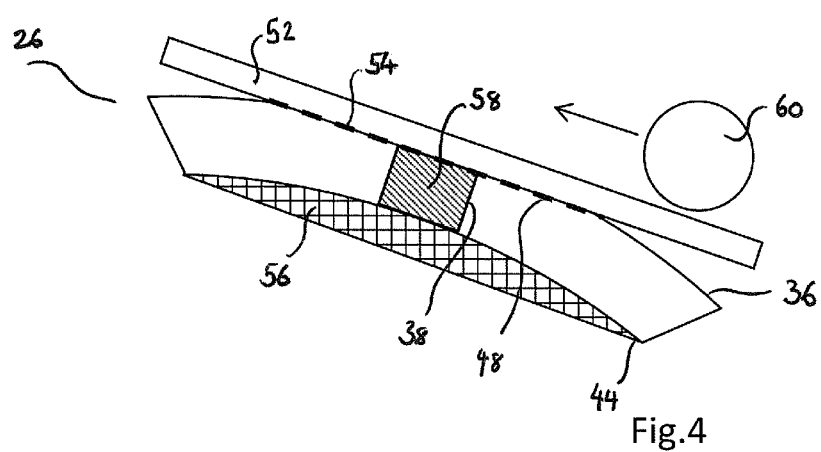
FIG. 4 shows a cross-section of a hollow aerofoil inclusive of a plate and welding tool; and, FIG. 5 shows a cross-section of a hollow aerofoil inclusive of a plate which has been welded to the aerofoil and blended to restore the original aerofoil dimensions, in accordance with embodiments of the present disclosure.

With reference to FIG. 4, a cross-section is shown through the aerofoil 26 previously shown in FIG. 3, the cross-section showing a view of the aerofoil 26 when viewing the plane along line A-A', from line A-A' towards the disk 28. In particular, FIG. 4 shows a cross-sectional view of the planar section 48 and opening 38 of the fill opening previously described in FIG. 2, the planar section 48 having been machined for example, by using a grinding, linishing or any such further machining or material removal operation, or added according to one or more previously described methods.

As shown in FIG. 4, once the planar section 48 has been machined into the low pressure surface or face 36 of the aerofoil 26, damping material 56 can be added to the void 42 to at least substantially fill one or more of the voids 42 contained between walls 44,46. The profile and thickness of both the low pressure and high pressure faces 36,37 define the void 42 and the quantity of damping material 56 required to fill the or each void 42. When introducing the damping material 56 into the aerofoil 26, one or more of the voids 42 contained between the side-walls 44,46 of the aerofoil 26 will be at least substantially filled with the damping material 56.

Following the filling stage, a plug 58 is placed within the opening 38 to at least substantially seal the opening 38 and prevent the previously supplied damping material 56 from escaping from the filled void 42. In the embodiment shown in FIG. 4, the plug 58 comprises parallel side walls 44,46, however it will also be appreciated that the plug 58 can be tapered or take the form of any such further shape as required. In further examples, the plug 58 can also, comprise a material which at least partially sets or conglomerates in situ. Once the plug 58 has been placed within one or more of the openings 38,40, a plate, strip, ribbon, powder, or molten pool of metallic material, or any combination thereof 52, is placed or deposited over the or each opening 38,40, and respective planar sections 48, to effectively cover the plug 58 located within the opening 38. Such a plate, strip, ribbon, powder, or molten pool of metallic material, or any combination thereof 52, can be subsequently or concurrently bonded to the aerofoil 26. In this way, the plug 58 can provide at least partial insulation, and hence protection of the damping material 56 from heat generated by the plate, strip, ribbon, powder, or molten pool of metallic material, or any combination thereof 52, being placed in and/or deposited over one or more openings 38,40 and respective adjacent planar sections 48,50.

In one example, it is also possible for the plug 58 to be excluded from the assembly. Here, it is possible to weld or deposit a plate, strip, ribbon, powder, or molten pool of metallic material, or any combination thereof 52, directly over the opening 38 before inserting a plug 58 into the opening 38. In a further example, it will be appreciated that the damping material 56 used to fill the void 42 can congeal or undergo a chemical reaction at or around the opening 38 to seal the void 42 before the plate, strip, ribbon, powder, or molten pool of metallic material, or any combination thereof 52, is placed or deposited over the opening 38 and planar section 48. In a yet further example, it will be appreciated that the plate, strip, ribbon, powder, or molten pool of metallic material, or any combination thereof 52, can be placed or deposited directly over the opening 38 and planar section 48 without prior coalescence of the damping material 56.

In any of the above examples, respective methods for depositing and fixing the plate, strip, ribbon, powder, or molten pool of metallic material, or any combination thereof 52, placed or deposited directly over the one or more openings 38,40 may only be used in situations or locations where the heat input into one or more of the aerofoil 26 and damping material 56 is maintained at levels which will not deleteriously effect or alter one or more of the chemical or mechanical characteristics of the damping material 56. Minimal heat input may be provided, for example, by using brazing, welding or bonding methods which provide minimal heat input via highly localised heating effects, so generating small heat affected zones. Such methods may include brazing or welding a plate or portion of material over the one or more openings 38,40 using one or more of, for example, laser, electron or particle beam welding. Furthermore, one or more layers of material can be directly deposited over the one or more openings 38,40 using additive layer manufacturing or material addition methods, including for example, direct or blown powder laser, electron or particle beam deposition.

Alternatively, friction bonding methods such as, for example, ultrasonic welding, friction welding, liner friction welding or friction stir welding may be used. When using ultrasonic welding, an ultrasonic welding apparatus, tool head and/or sonitrode 60 traverses over the deposited material 52 to weld, braze or bond the deposited material 52 to the aerofoil 26. In doing so, the tool head and/or sonitrode 60 contacts the deposited material 52, the rapidly vibrating tool head and/or sonitrode 60 creating friction between the head and/or sonitrode 60 and the deposited material 52. In use, the friction created between the head and/or sonitrode 60 and the deposited material 52 heats the deposited material 52 and/or the aerofoil 26 in order to plasticise the respective materials. By providing physical contact and a positive pressure between the deposited material 52 and/or the aerofoil 26 at or above the plasticising temperature of the respective materials, and subsequently cooling the deposited material 52 and/or the aerofoil 26 assembly to below the plasticising temperature of the respective materials, a physical bond is developed between the deposited material 52 and the aerofoil 26.

In a further example, friction stir welding methods can include the use of an at least partially plug-shaped tool which fits into and engages side walls of the respective openings 38,40. In such an example, the tool forms the plug 58, which may be bonded to the aerofoil 26 by friction welding within one or more of the openings 38,40. Here, is a similar manner to that described in the ultrasonic welding step previously outlined, friction is created by rotating a tool head whilst contacting one or more of the plug 58, deposited material 52 and/or the aerofoil 26. In this way, friction is developed which heats the plug 58, deposited material 52 and/or the aerofoil 26 in order to plasticise the respective materials prior to bonding. Following cooling and/or bonding, any protruding portions of the tool remaining following friction welding of the plug 58 to the side walls of the respective openings 38,40 and/or planar section 48,50 adjacent each of the openings 38,40 can be subsequently removed in a further material removal process. In this way, the step of welding a plate or depositing a plate, strip, ribbon, powder, or molten pool of metallic material, or any combination thereof 52 directly over the opening 38 is removed in favour of fixing a metallic plug within one or more of the respective openings 38,40.

In all such examples, the heat generated or transferred to the damping material 56 when depositing material i.e. a plate, strip, ribbon, powder, molten pool of metallic material, or fixing a metallic plug within one or more of the respective openings 38,40 directly over the opening 38, or any combination thereof 52, should be maintained or controlled at levels which are below those which deleteriously effect the damping material. Accordingly, heat energy may also be removed from one or more of the aerofoil 26 and damping material 56 before, during and/or after heating by providing one or more of a further heat sink or externally applied cooling of one or more of the heated areas. Such cooling may be applied in the form of a cooled fluid directed at the one or more heated areas. Such fluids may include, for example, an inert fluid such as argon gas. Additionally or alternatively, damping materials 56 resistant to high temperatures may be used in those areas of the void 42 expected to be exposed to high temperatures.

In reducing, minimising or controlling the amount of heat energy available for transfer into the damping material 56 during one or more of manufacture or repair of the aerofoil 26 or component, the damping material 56 is prevented from undergoing a microstructurel or physical change, which at least partially alters its operational vibration damping characteristics. If a microstructurel or physical change of the damping material occurs, the damping material can behave in an unpredictable way. In this way, the damping material can either become unsuitable for use, or result in insufficient damping of the aerofoil. Such insufficient damping can thus lead to an increased risk of component failure.

In the embodiment shown in FIG. 4, the deposited material 52 is comprised of a Ti-6Al-4V plate or sheet, and is one or more of metellurically and mechanically similar to that of the parent aerofoil 26, so minimising the use of additional materials. In using a material which is one or more of matellurically and mechanically similar to that of the parent aerofoil 26, contamination, differential expansion and compatibility issues are at least partially overcome. In further examples, the plate, strip, ribbon, powder, molten pool of metallic material, metallic plug, or any combination thereof 52 can be comprised of a material which is one or more of matallurically and mechanically disimilar to that of the parent aerofoil 26. Such materials which are one or more of matallurically and mechanically disimilar to that of the parent aerofoil 26 can comprise further and matallurically distinct alloys comprising, for example, titanium, titanium alloy, aluminium, aluminium alloy, nickel, nickel alloy, copper, copper alloy, lead, lead alloy, iron, steel alloy, magnesium alloy, beryllium alloy or any combination thereof. It will be appreciated that in addition, further aerospace alloys can be used depending on working temperature and further mechanical property considerations including, for example, yield stress and elevated temperature creep resistance requirements.

In the specific example shown in FIG. 4, the covering of the opening 38 is achieved by placing and bonding a plate 52 over the opening 38, plug 58 and planar section 48,50. As such, the dimensions of the plate 52 exceeds the normal dimensional tolerance margins of the aerofoil 26 during manufacture such that excess material is preferably removed from the plate 52 and aerofoil 26 assembly to once again meet dimensional tolerance requirements. In further examples, the covering of the opening 38 is achieved by placing a plate 52, strip, ribbon, powder, molten pool of metallic material, metallic plug, or any combination thereof over one or more of the opening 38, plug 58 and planar section 48,50. In an alternative example to that shown in FIG. 4, the plate 52, strip, ribbon, powder, molten pool of metallic material, metallic plug, or any combination thereof can also be applied and bonded to the planar sections previously built upon the original surface of the aerofoil 26. In such an example, only the previously built planar sections and the plate 52, strip, ribbon, powder, molten pool of metallic material, metallic plug, or any combination thereof over one or more of the opening 38, plug 58 and planar section would regularly require removal in order to restore the aerofoil 26 assembly to meet acceptable dimensional tolerance requirements.

In further examples, the plate 52, strip or ribbon, applied to the one or more machined or built planar sections can be shaped such that it at least partially corresponds to the curvature and/or contour of the aerofoil 26. Accordingly, the requirment for providing a planar section 48 upon the face 36 of the aerofoil 26 can be avoided or at least partially reduced through the planar or at least partially shaped plate 52 being shaped or contoured in order to ensure the required additional contact area. Furthermore, it will also be appreciated that material directly deposited at, around, or over one or more of the opening 38, plug 58 and planar section can ensure the required additional contact area, again ensuring that the requirment for providing a planar section 48 upon the face 36 of the aerofoil 26 can be avoided or at least partially reduced. However, despite the potential for the avoidance of the planar section 48 within the manufacturing process, it will be appreciated that it may be advantageous for the mechanical properties and/or continuity of the weld 54 to ensure its provision.

In an example where the at least partially plug-shaped tool is fitted into, and engaged or bonded to the aerofoil 26 between the side walls of the respective openings 38,40, the covering of one or more of the opening 38, plug 58 and planar section 48,50 by placing a plate 52, strip, ribbon, powder, molten pool of metallic material, or any combination thereof over is not required, although may be additionally used according to requirements. In such an example, the at least partially plug-shaped tool is instead machined following bonding to restore the aerofoil 26 assembly to meet acceptable dimensional tolerance requirements. In further examples, the plate 52, strip, ribbon, powder, molten pool of metallic material, metallic plug, or any combination thereof, can comprise two or more layers, each successive layer being built up upon at least the aerofoil substrate material or face 36,37 of the aerofoil 26, or a previously deposited layer of material 52. In a further example, material can be deposited by direct deposition and/or welding methods. Such methods can include, for example, one or more of additive layer manufacturing or material addition methods, including direct or blown powder laser deposition. Material addition methods can be used to build up material in or around side walls of the opening 38 so that the opening may be closed. Deposition patterns can follow, for example, a progressive spiral-type deposition layer, or two or more separate layers of material. Such a method for closing the opening would result in a protruding dome or cone of material covering the hole. Alternatively, a foam layer can be inserted or injected into at least a portion of the opening, upon which the layer of material can be built. Such a foam can be permanent or temporary, that is to at least partially degrade upon application of heat, according to requirements.

As shown in FIG. 4, Once the deposited material has been positioned over one or more of the planar section 48, opening 38 and plug 58, the plate 52, strip, ribbon, powder, molten pool of metallic material, metallic plug, or any combination thereof, can be welded 54, brazed or bonded to the aerofoil 26 in order to seal the plug 58 within the opening 38. In this way, the plug seals the damping material 56 within one or more of the voids 42.

In one example, a welding, brazing or bonding operation is achieved using a bonding apparatus such as, for example, an ultrasonic welding apparatus, tool head and/or sonitrode 60 which is able to traverse over the deposited material to weld, braze or bond the deposited material to the aerofoil 26. As such, the welding tool 60 as shown in FIG. 4 can be hand-held, or can be one or more of supported, manipulated and/or moved relative to the aerofoil 26, or vice-versa, by a CAD/CAM assembly. Thus, the bonding apparatus can also be used to weld, braze or bond additionally deposited material 52 to the surface 36,37 of the aerofoil 26.

Figure 5:
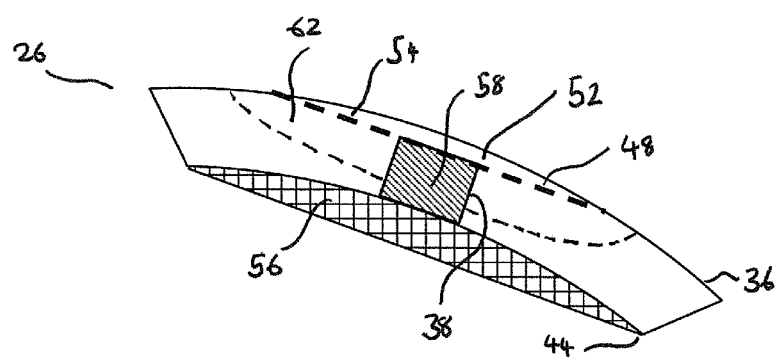

As shown in FIGS. 4 and 5, the use of a welding, brazing or bonding operation including, for example, an ultrasonic welding apparatus, tool head and/or sonitrode 60, is particularly suited to the present bonding application, due in part to ultrasonic welding providing a very localised heating effect, and so a small heat affected zone 62 (HAZ). Ultrasonic welding is a low-temperature bonding process wherein one or more of the deposited material 52, aerofoil substrate 26 or plug are locally heated to or within a plasticising temperature zone wherein bonding can occur. According to the presently described apparatus and/or method, bonding at least a portion one or more of the deposited material 52, aerofoil substrate 26 or plug at or within the plasticising temperature zone aids in reducing the size of the HAZ 62, so reducing the amount of heat energy available for transfer into the damping material 56. In this regard, the HAZ 62 represents a portion of one or more of the deposited material 52, aerofoil substrate 26 or plug which has undergone a microstructurel change as a result of heating. In such an instance, minimising the size of the resultant HAZ 62 following welding, brazing, or material addition is known to minimise deleterious metallurgical and mechanical effects whilst avoiding overheating, and thus damage of the damping media 56 contained within the void 42.

In further examples, the described process can be used to seal similar openings in other components where high integrity is required and/or where a delicate filler material needs to be contained and/or protected within a high integrity opening closure. In welding, brazing, bonding or machining the aerofoil 26, it is possible for a HAZ 62 to be generated at or adjacent to the bond location. Therein, the depth and/or size of the HAZ 62 can be dictated by, for example, the material utilised in the aerofoil 26 construction, temperature and and/or time of exposure to elevated temperature. By reducing the heat input by using methods which seek to minimise the size of the HAZ 62, deleterious metallurgical and mechanical effects and damage to the damping media 56 contained within the void 42 can be at least partially avoided.

With reference to FIG. 5, a cross-section is shown through the aerofoil previously shown in FIG. 3. In particular, FIG. 5 shows the aerofoil 26 previously shown in FIG. 4, inclusive of a plate 52 which has been welded 54 to the aerofoil and blended to restore the original aerofoil dimensions required for the aerofoil 26 to once again meet dimensional tolerance requirements. It will be appreciated that any such blending operation can be employed in restoring the original dimensions of the aerofoil 26, such methods including, for example, adaptive machining, linishing, CAD/CAM operations, or any combination of the same. Such blending using hand-held, manual or CAD/CAM operations ensure that that the final aerofoil profile over one or more of the opening 38, deposited material 52, aerofoil substrate 26 or plug 58 would be at least substantially indistinguishable from the other outer surfaces or outer faces 36,37 of the aerofoil 26. In this way, the blended portion provides a covering over one or more of the opening 38, deposited material 52, aerofoil substrate 26 or plug 58 to protect any one or more of the opening 38, plug 58 and damping material 56 during further manufacture, processing or use.

It will be understood that the disclosure is not limited to the embodiments above-described and various modifications and improvements can be made without departing from the concepts described herein. In particular, it will be appreciated that any such localised or low heat input welding, brazing or bonding operation may be used in preference to the ultrasonic welding techniques described herein.

Except where mutually exclusive, any of the features may be employed separately or in combination with any other features and the disclosure extends to and includes all combinations and sub-combinations of one or more features described herein.

I claim:

1. A method of sealing one or more openings provided in a wall of an aerofoil for a gas turbine engine, the aerofoil comprising at least one cavity which is at least partly filled with a vibration damping material, the method comprising steps to:
   a) heat and plasticise at least a portion of the aerofoil wall and a metallic material;
   b) provide the metallic material onto the wall of the aerofoil in order to cover the opening; and
   c) bond the metallic material to the wall of the aerofoil at or within a plasticised temperature zone of the metallic material and the wall of the aerofoil to seal the opening,
   wherein step a) occurs prior to or during step b).

2. A method as claimed in claim 1, wherein step b) of claim 1 comprises steps to overlap the metallic material and the wall such that a weld interface between the metallic material and the wall is generally co-planar with the wall of the aerofoil.

3. A method as claimed in claim 1, wherein the metallic material comprises a metal or alloy comprising either or both of substantially identical chemical composition or mechanical properties to the wall of the aerofoil.

4. A method as claimed in claim 1, wherein the method comprises steps to form a planar section on the wall of the aerofoil in an area adjacent to or surrounding the opening.

5. A method as claimed in claim 4, wherein the steps to form a planar section on the wall of the aerofoil comprises further steps to remove at least a portion of the wall from the aerofoil.

6. A method as claimed in claim 1, wherein the metallic material comprises two or more layers.

7. A method as claimed in claim 1, wherein the metallic material comprises one or more layers and step c) of claim 1 comprises steps to heat and plasticise at least a portion of the aerofoil wall and at least one of the one or more layers of the metallic material.

8. A method as claimed in claim 1, wherein the metallic material is provided in the form of one or more of a plate, strip, ribbon or a body of further three-dimensional shape.

9. A method as claimed in claim 1, wherein the metallic material is a metallic plug or blocking member, step b) of claim 1 comprising steps to insert the plug or blocking member into the opening prior to step c) of claim 1.

10. A method as claimed in claim 1, wherein step c) of claim 1 comprises steps to ultrasonically weld the metallic material to the wall of the aerofoil.

11. A method as claimed in claim 1, wherein the metallic material is provided in the form of a powder.

12. A method as claimed in claim 1, the method comprising steps to at least partially solidify the damping material before step b) of claim 1.

13. An aerofoil for a gas turbine engine, the aerofoil comprising:
   one or more openings provided in a wall of the aerofoil; and
   at least one cavity which is at least partly filled with a vibration-damping material,
   at least one of the openings provided in the wall of the aerofoil being covered with a metallic material, and
   at least a portion of the aerofoil wall and the metallic material having been heated and plasticised prior to the metallic material having been bonded to the wall of the aerofoil at or within a plasticised temperature zone of the metallic material and the wall of the aerofoil to seal one or more of the openings, the heating and plasticising of the at least a portion of the aerofoil wall and the metallic material having occurred before, or during, provision of the metallic material onto the aerofoil wall.

14. A method as claimed in claim 1, wherein the metallic material is bonded to the wall of the aerofoil without chemically or microstructurally altering the vibration damping material.

* * * * *